(12) United States Patent
Goupil, Jr. et al.

(10) Patent No.: US 7,371,161 B2
(45) Date of Patent: May 13, 2008

(54) SLIDING FILM VALVE DRIVEN AT EDGE

(75) Inventors: Gerald M. Goupil, Jr., N. Tonawanda, NY (US); Phillip M. Sokolofsky, Akron, NY (US)

(73) Assignee: Delphi Technologies, Inc., Troy, MI (US)

( * ) Notice: Subject to any disclaimer, the term of this patent is extended or adjusted under 35 U.S.C. 154(b) by 58 days.

(21) Appl. No.: 11/116,504

(22) Filed: Apr. 28, 2005

(65) Prior Publication Data

US 2006/0046632 A1 Mar. 2, 2006

Related U.S. Application Data

(60) Provisional application No. 60/605,314, filed on Aug. 27, 2004.

(51) Int. Cl.
*B60H 3/00* (2006.01)
*B60S 1/54* (2006.01)

(52) U.S. Cl. .................... 454/156; 454/121

(58) Field of Classification Search ............... 454/121, 454/156; 251/901
See application file for complete search history.

(56) References Cited

U.S. PATENT DOCUMENTS

| | | |
|---|---|---|
| 5,145,456 A | 9/1992 | Ito et al. |
| 5,154,223 A | 10/1992 | Ishimaru et al. |
| 5,160,115 A | 11/1992 | Ito et al. |
| 5,243,830 A | 9/1993 | Ito et al. |
| 5,472,790 A | 12/1995 | Thompson |
| 5,564,979 A | 10/1996 | Sumiya et al. |
| 5,653,630 A | 8/1997 | Higashihara |
| 5,676,595 A | 10/1997 | Sumiya et al. |
| 5,885,152 A | 3/1999 | Lardlaw |
| 5,890,651 A | 4/1999 | Kanda |

(Continued)

FOREIGN PATENT DOCUMENTS

DE 03237054 * 4/1984

(Continued)

OTHER PUBLICATIONS

Translated Abstract , application De 3237054.*

(Continued)

*Primary Examiner*—Steven McAllister
*Assistant Examiner*—Helena Kosanovic
(74) *Attorney, Agent, or Firm*—Patrick M. Griffin

(57) ABSTRACT

A valve including a film having edges and a plurality of openings disposed between the edges is supported by the housing of an automotive a heating, ventilation and air conditioning system to control the flow of air blown into the passenger compartment. The film has recesses along both edges. The film is reciprocated along the curved path by a first pair of sprockets supported on a shaft and presenting first axial teeth engaging the recesses along the edges of the film (FIGS. 3-5), or a second pair of sprockets having first radial teeth engaging the recesses in the edges of the film and driven from the shaft by bevel gears (FIGS. 5-8), or third pair of sprockets having second radial teeth engaging the recesses in the edges of the film and driven by a spur (FIG. 9), or by the spur directly engaging the recesses in the edges of the film (FIG. 10).

25 Claims, 7 Drawing Sheets

U.S. PATENT DOCUMENTS

| | | |
|---|---|---|
| 5,899,262 A | 5/1999 | Yamaguchi et al. |
| 5,899,806 A | 5/1999 | Hase et al. |
| 5,916,021 A | 6/1999 | Danieau |
| 6,045,444 A | 4/2000 | Zima et al. |
| 6,048,263 A | 4/2000 | Uchida et al. |
| 6,270,400 B1 | 8/2001 | Tsurushima et al. |
| 6,293,339 B1 | 9/2001 | Uemura et al. |
| 6,296,562 B1 * | 10/2001 | Uemura et al. .............. 454/121 |
| 6,305,462 B1 | 10/2001 | Tsurushima et al. |
| 6,347,988 B1 | 2/2002 | Kurokawa et al. |
| 6,351,961 B1 | 3/2002 | Kurokawa et al. |
| 6,354,935 B1 | 3/2002 | Kurokawa et al. |
| 6,382,305 B1 | 5/2002 | Sano |
| 6,450,877 B2 | 9/2002 | Tsurushima et al. |
| 6,508,703 B1 | 1/2003 | Uemura et al. |
| 6,568,468 B1 | 5/2003 | Uemura et al. |
| 6,569,009 B2 | 5/2003 | Nishikawa et al. |
| 6,588,495 B2 | 7/2003 | Ito et al. |
| 6,612,922 B2 | 9/2003 | Uemura et al. |
| 6,669,549 B2 | 12/2003 | Uemura et al. |
| 6,688,964 B2 | 2/2004 | Uemura et al. |
| 6,811,481 B2 | 11/2004 | Uemura et al. |
| 2001/0008148 A1 | 7/2001 | Ito et al. |
| 2003/0013404 A1 | 1/2003 | Uemura et al. .............. 454/121 |
| 2003/0171091 A1 | 9/2003 | Uemura et al. |
| 2003/0232590 A1 | 12/2003 | Okumura et al. |
| 2004/0043720 A1 | 3/2004 | Uemura et al. |

FOREIGN PATENT DOCUMENTS

| | | |
|---|---|---|
| DE | 38 20 525 C2 | 2/1992 |
| EP | 1344644 A | 9/2003 |
| EP | 1346859 A | 9/2003 |
| GB | 1543128 | 3/1979 |
| JP | 09128913 A | 5/1997 |

OTHER PUBLICATIONS

EP 05 07 6841 European Search Report dated Oct. 14, 2005.

\* cited by examiner

# SLIDING FILM VALVE DRIVEN AT EDGE

RELATED APPLICATIONS

This patent application claims priority to and all advantages of U.S. Provisional Patent Application No. 60/605,314, which was filed on Aug. 27, 2004.

BACKGROUND OF THE INVENTION

1. Field of the Invention

The subject invention generally relates to a heating, ventilation and air conditioning (HVAC) system of the type including a valve for controlling air flow. More specifically, the HVAC systems include a film valve that is linearly movable for controlling air flow.

2. Description of the Prior Art

These HVAC systems are known in the art for use in automobiles and include a housing that defines an air passage for directing air flow through the housing. A film having edges and openings to allow air to pass through is supported by the housing and serves as an air distribution valve to control the air flow. Frequently, a sprocket is rotatably supported by the housing and has teeth engaging holes in the film to move the film linearly across the air passage. U.S. Pat. No. 6,569,009 exhibits one example of such an HVAC system.

Due to air pressure and vibration, such films frequently float relative to drive mechanisms and negatively affect the engagement between the drive mechanism and the film.

SUMMARY OF THE INVENTION AND ADVANTAGES

The invention provides a heating, ventilation and air conditioning (HVAC) system including a housing defining an air passage for directing air flow through the housing. A valve includes a film having edges and an opening disposed between the edges. The film is supported by the housing and extends across the passage. A first sprocket is rotatably supported by the housing for rotation about an axis and has teeth that engage the film to move the film linearly. The film has recesses along at least one edge and the teeth of the sprocket extend into those recesses in the film.

Accordingly, the invention under air pressure and vibration allows the film to move or float while remaining in driving engagement with the sprockets. Furthermore, the invention allows flexibility for engineering of openings in the film, both in terms of geometry of the openings and position of the openings within the film.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE PREFERRED EMBODIMENT

Figure 1:
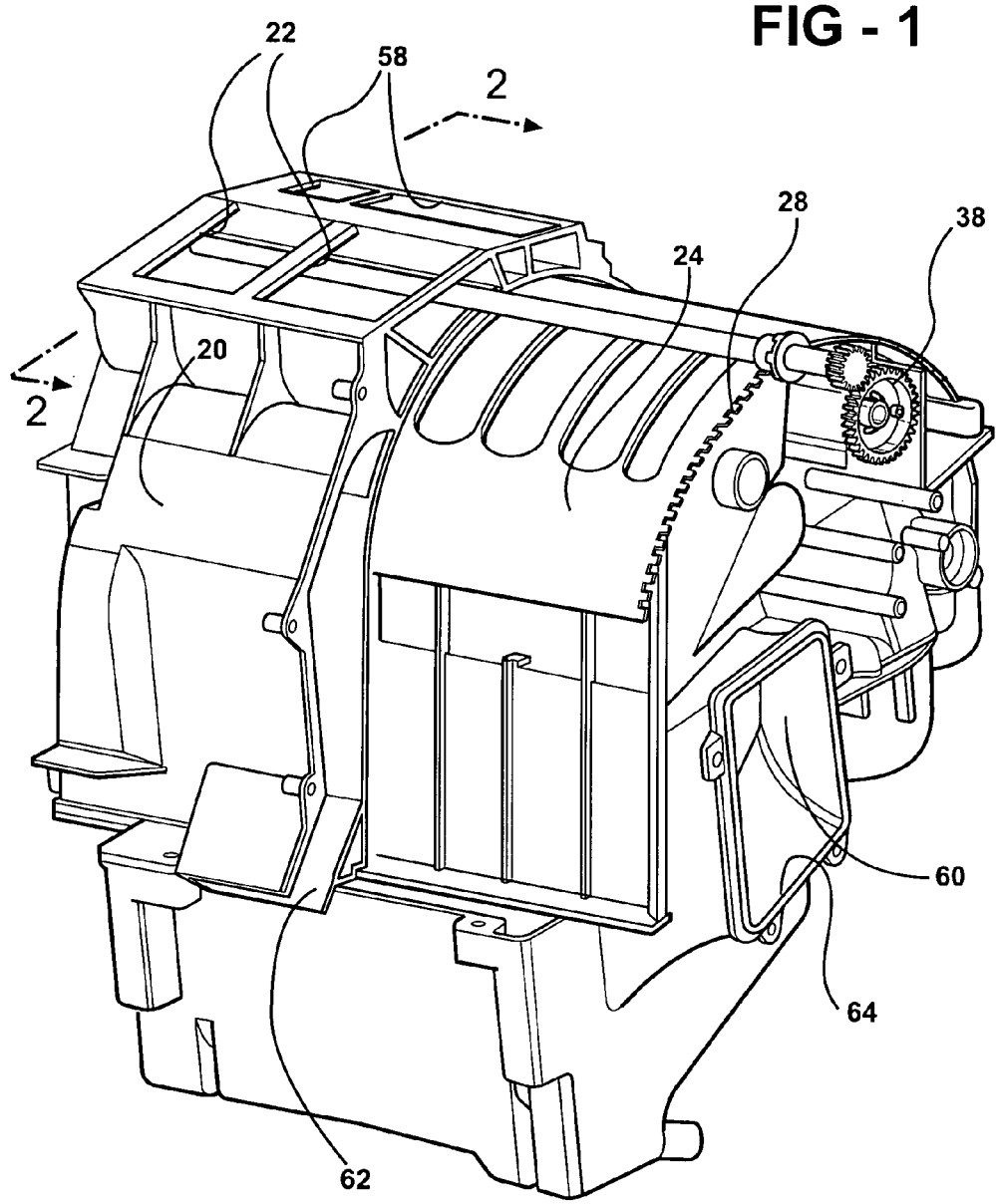
FIG. 1 is a partially cut away perspective view of a HVAC system employing the valve of the subject invention.

A heating, ventilation and air conditioning (HVAC) system is shown in FIG. 1 and comprises a housing 20 typically made of resin and mounted approximately centrally in the vehicle (not shown) behind a dashboard in the passenger compartment. The housing 20 defines an air passage 60 that extends through the entire housing 20 for directing air flow through the housing 20. The housing includes an air inlet 64 to feed air to the air passage 60. The housing 20 also includes one or more outlets, e.g., passenger compartment and/or defrost, etc. The air flow is directed through the housing 20, i.e., through the air passage 60, to the outlets. A blower (not shown) is attached to the housing 20 to move air through the air passage 60 defined by the housing 20. The housing 20 may also define additional air passages (not shown). If the housing 20 defines additional air passages, the additional air passages also direct air flow through the housing 20 in concert with the air passage 60.

Figure 2:
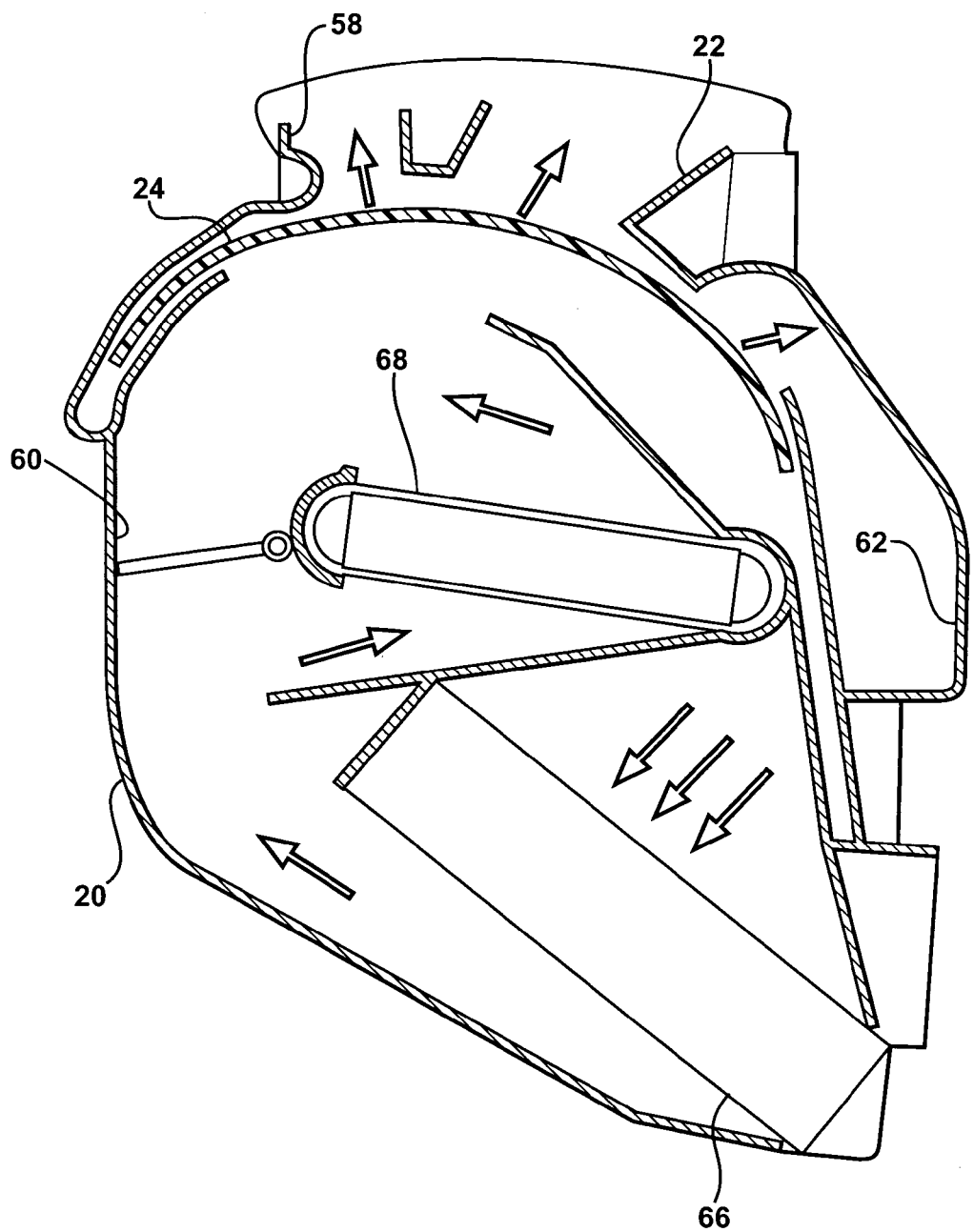
FIG. 2 is a cross-sectional view of the HVAC system of FIG. 1 taken along line 2-2.

The HVAC system further includes a heat exchanger supported in the housing 20 for exchanging heat with air passing through the passage 60. More specifically, referring to FIG. 2, an evaporator core 66 and a heater core 68 are disposed inside the housing 20 usually in that order from an air-upstream side. The evaporator core 66 is a part of an ordinary refrigerating cycle, and is used as a cooling heat exchanger for cooling air flowing through the housing 20. Refrigerant in the evaporator core 66 is evaporated by absorbing heat from air in the air passage 60, so that air passing through the evaporator core 66 is cooled. The heater core 68 is a heat exchanger supported in the housing 20 for exchanging heat with air passing through the air passage 60, i.e., heating air inside the housing 20 by using hot water (engine-cooling water) flowing therethrough as a heat source.

The housing 20 includes a plurality of the outlets and a valve including a film 24 is disposed to extend across the outlets for controlling air flow through the outlets. Among the outlets, a defroster port 58 is connected to a defroster duct (not shown), so that conditioned air is blown through a defroster vent (not shown) at a top end of the defroster duct toward an inner side of a front windshield (not shown) of the vehicle. A face duct (not shown) is connected to a face port 22, so that conditioned air is blown from a face vent (not shown) at a top end of the face duct toward the upper body of a passenger in a passenger compartment of the vehicle. Also, a foot delivery duct (not shown) is connected to a foot port 62, and foot vents (not shown) for blowing conditioned air toward the foot area of the passenger in the passenger compartment. The foot vents are provided at the ends of branches (not shown) of the foot delivery duct on the housing 20.

The film 24 has edges and an opening 26 disposed between the edges. Preferably, the film 24 has a plurality of the openings 26, with each of the openings 26 being elongated with parallel sides and rounded corners. As will become apparent below, the film 24 may be maintained in an arced shape, which subjects the film 24 to constant bending stress. Furthermore, the constant air flow exerts forces on the film 24 that cause internal stresses. The rounded corners prevent tearing of the film 24 when the film 24 is subjected to stress. The alleviation of stress decreases tearing, cracking, or other mechanical failure of the film 24. In addition, the openings 26 may be of different lengths so that the stress is not concentrated along a single axis passing through ends of the openings 26. Furthermore, the different lengths of the openings 26 may be due to customization that is often required to achieve performance targets, such as achieving a desired air flow profile without yielding unacceptable noise levels.

Figure 3:
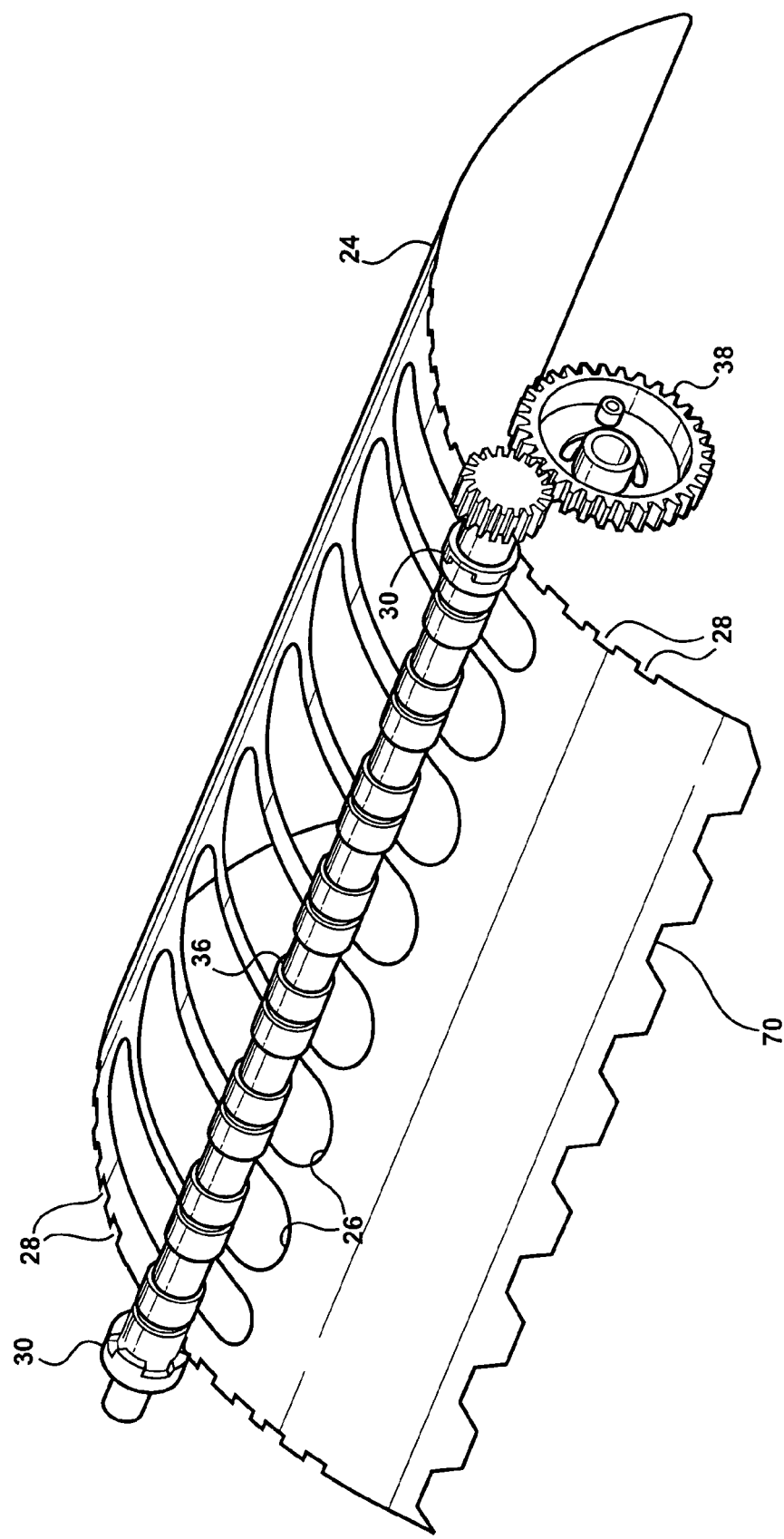
FIG. 3 is a perspective view of a first embodiment of the valve of the subject invention.

The film 24 includes a leading edge extending between the side edges and a trailing edge extending between the side edges. The film 24 also defines an outer surface and a width with the outer surface extending across the width to distal terminal peripheries of the film 24, which in turn define opposing first and second peripheral edges of the film 24. The peripheral edges extend transverse to the outer surface to define a thickness of the film 24 substantially transverse to the width. In order to facilitate movement of the film 24, increase flexibility of the film 24, and reduce noise, at least one of the leading edge and the trailing edge may be undulated 70, as shown in FIG. 3. The undulation 70 may be a continuous curve in the form of a wave or serrated in the form of a plurality of apexes.

In addition to the openings 26, either the leading edge or the trailing edge of the film 24 may define another opening with the housing 20 to facilitate the air flow through the passage 60. This allows desired air distributions to be achieved without using a longer length of film, which adds cost to the HVAC system. Furthermore, the use of additional film 24 would require additional time to position the film 24 to achieve the desired air flow profile.

As will be described in further detail below, the edges of the film 24, more specifically the side edges, have recesses 28 disposed along the edges to facilitate movement of the film 24. Each of the recesses 28 preferably has three sides defined by the film 24 such that the recesses 28 are open to the edge, as shown in FIGS. 1 and 3-10.

The film 24 is supported by the housing 20 to extend across the air passage 60 for controlling the flow of air blown into the passenger compartment. To allow the size of the housing 20 to be made compact, the film 24 extends linearly along a curvature whereby the film 24 moves linearly in a curved or arcuate path. Preferably, the curvature is between flat and 100 mm. Accordingly, the film 24 is made of a flexible plastic material, e.g., polypropylene, having a thickness between 0.001 and 0.03 inches and a flexural modulus between 100,000 and 300,000 psi. Alternatively, the film 24 may be made of a polypropylene co-polymer, a resin material such as PTFE (polytetrafluoroethylene) which is flexible and has a low frictional resistance, or any combination of the above-mentioned plastic materials. An elastomer having a suitable rigidity may also be used.

Figure 4:
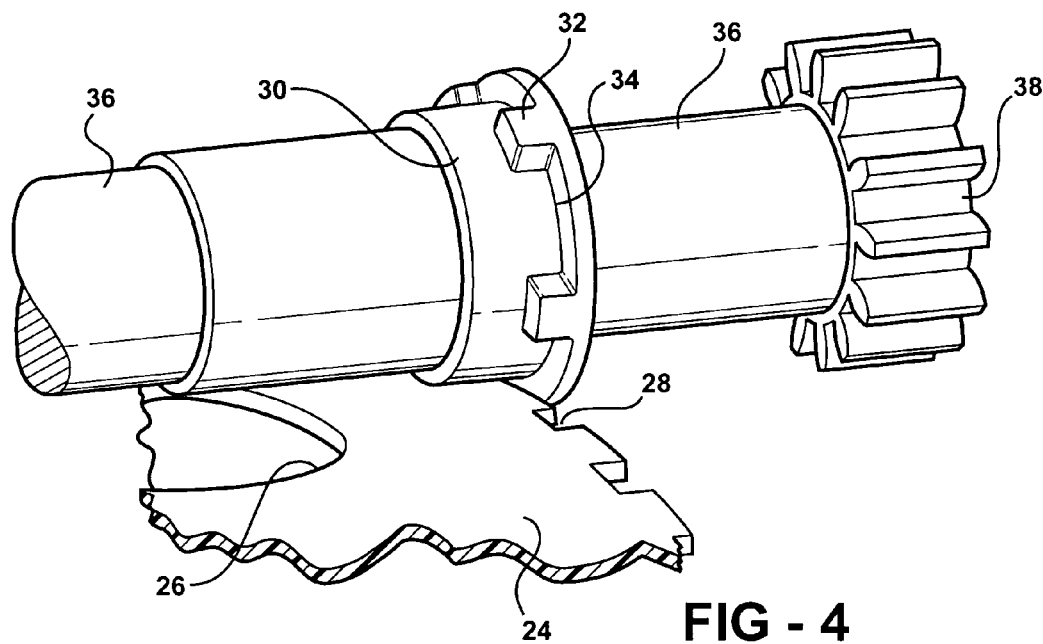
FIG. 4 is an enlarged perspective view of the first embodiment of the valve of the subject invention.
Figure 5:
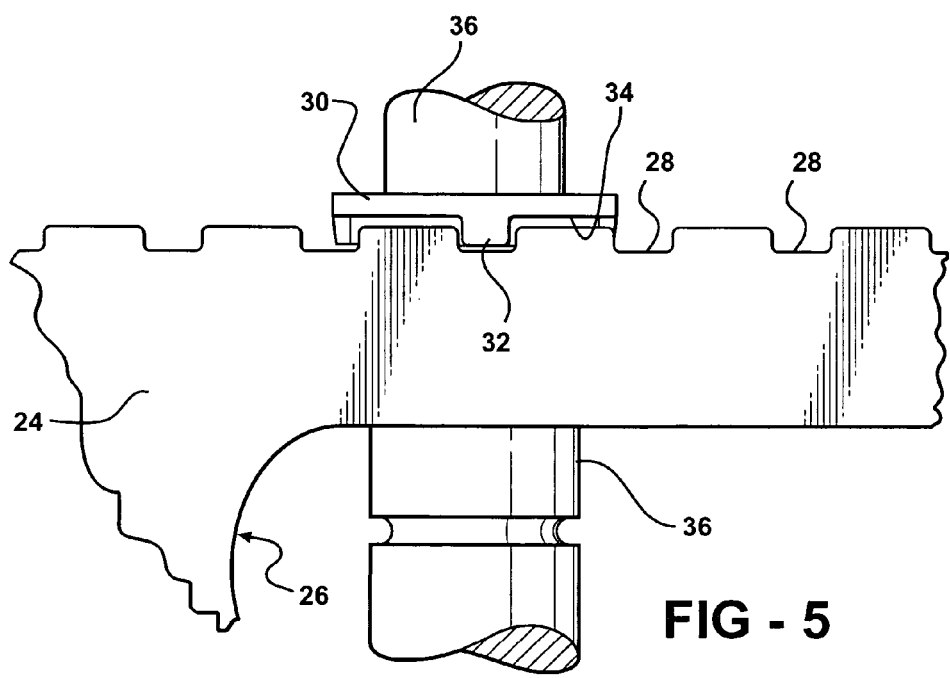
FIG. 5 is a plan view of the first embodiment of the valve of the subject invention.

In a first embodiment of the subject invention, as seen in FIGS. 3-5, the film 24 is reciprocated along the curved path by a first pair of sprockets 30 each rotatably supported by the housing 20 for rotation about an axis of rotation. The first pair of sprockets 30 have first axial teeth 32 engaging the recesses 28 in the edges of the film 24 for moving the film 24 linearly, i.e., in the direction of the edges of the film 24. Each of the first pair of sprockets 30 includes a radial surface 34 extending between adjacent first axial teeth 32 facing the edge of the film 24. The radial surface 34 extends radially relative to the axis of rotation of each of the first pair of sprockets 30. The first axial teeth 32 extend axially from the radial surface 34.

The first pair of sprockets 30 includes a first sprocket engaging one edge of the film 24 and a second sprocket engaging the other edge of the film 24. A shaft 36 extends between the edges of the film 24. The shaft 36 is disposed so as to extend in the width direction of the film 24 on the upstream side (the upstream side in the airflow) of the film 24. One end of the shaft 36 is connected outside the housing 20 to a drive motor (for example a stepping motor) (not shown), and the shaft 36 is rotationally driven in forward and reverse directions by the drive motor through a gear set 38. The first pair of sprockets 30 are rotated with their first axial teeth 32 engaging the recesses 28 along the edges of the film 24, to apply a driving force in the reciprocation or linear direction of the film 24. Preferably, the first axial teeth 32 have a thickness transverse to the film 24 of at least 0.125 inches. More preferably, the first axial teeth 32 have a thickness of from 0.125 to 1 inches, most preferably about 0.375 inches. The first axial teeth 32 having the thicknesses in the above ranges give the film 24 freedom to float relative to the first axial teeth 32, along the teeth 32, while still maintaining engagement between the first axial teeth 32 and the film 24.

Figure 6:
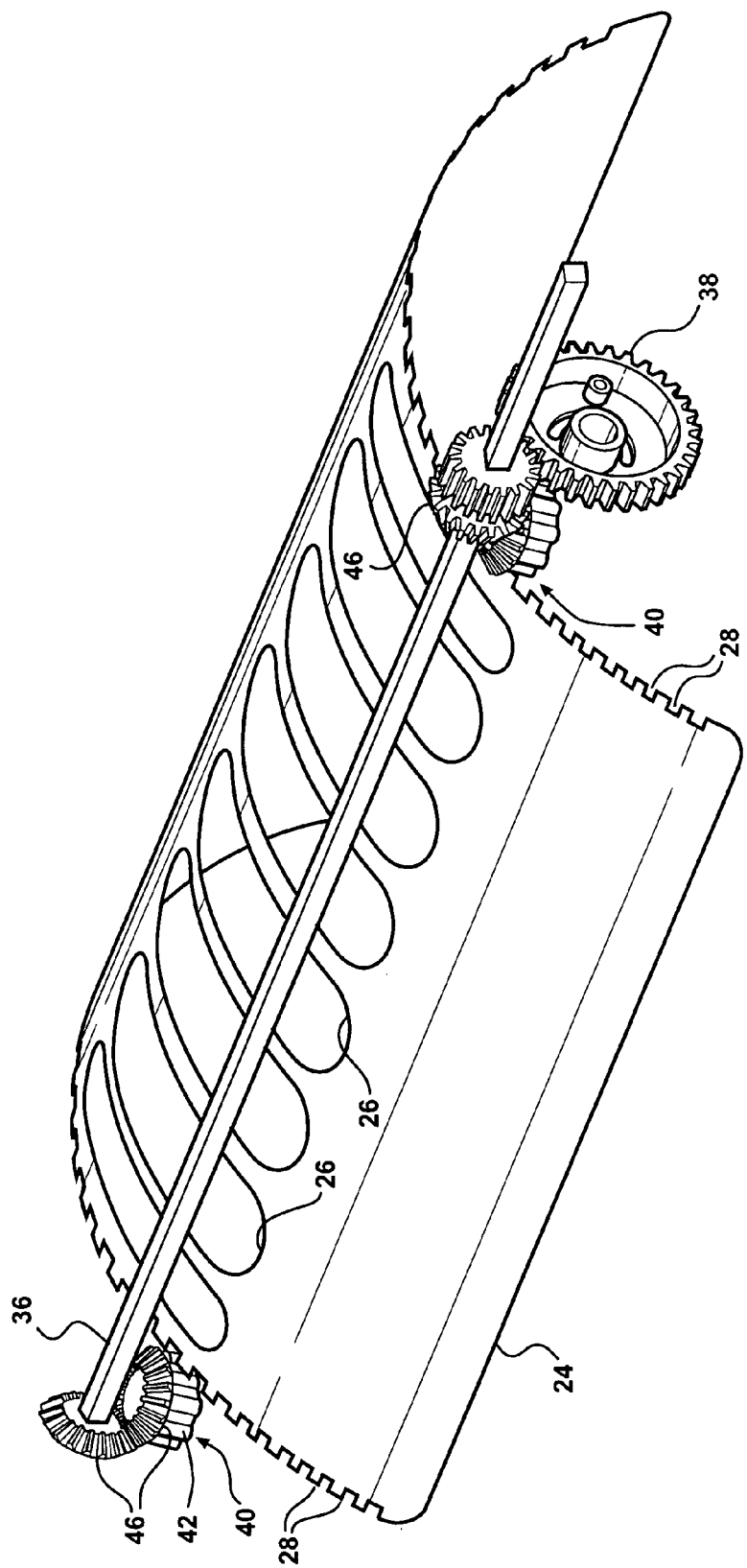
FIG. 6 is a perspective view of a second embodiment of the valve of the subject invention.
Figure 7:
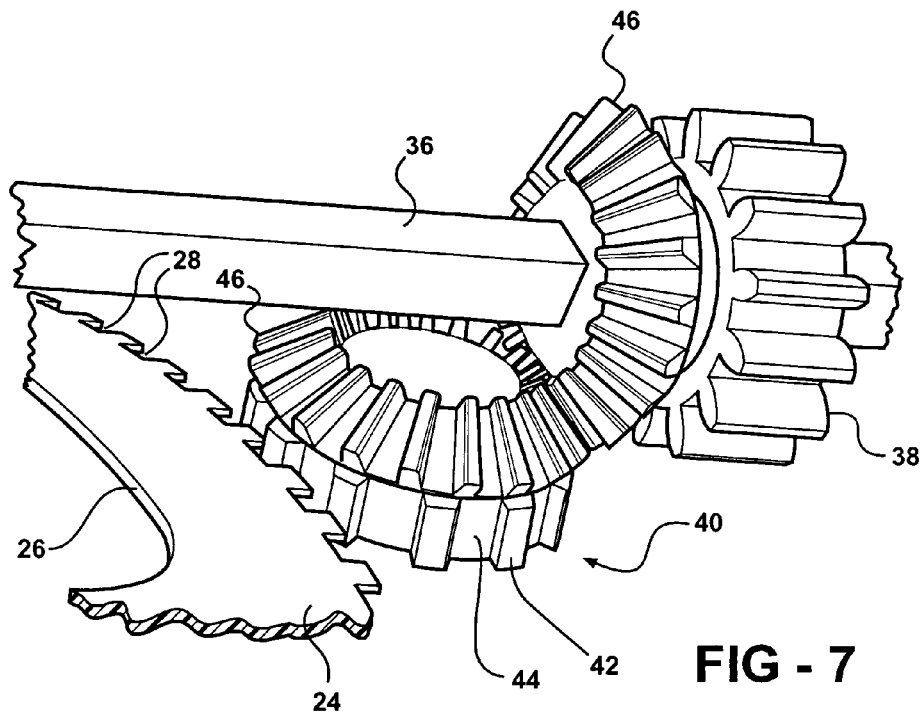
FIG. 7 is an enlarged perspective view of the second embodiment of the valve of the subject invention.
Figure 8:
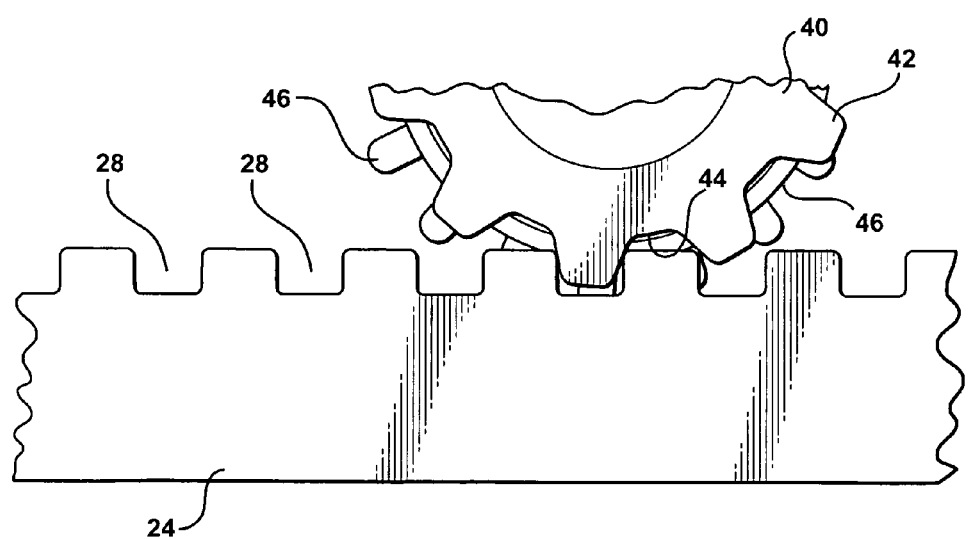
FIG. 8 is a plan view of the second embodiment of the valve of the subject invention.

In the second embodiment of the subject invention, as seen in FIGS. 6-8, the film 24 is reciprocated along the curved path by a second pair of sprockets 40 each rotatably supported by the housing 20 for rotation about an axis of rotation. The axis of each of the second pair of sprockets 40 is disposed transversely to the film 24.

The second pair of sprockets 40 have first radial teeth 42 engaging the recesses 28 in the edges of the film 24 for moving the film 24 linearly, i.e., in the direction of the edges of the film 24. The first radial teeth 42 extend radially from the axis of rotation and parallel to the film 24 to engage the recesses 28 from the edge. Each of the second pair of sprockets 40 includes a circumferential or first axial surface 44 extending between adjacent first radial teeth 42 and facing the edge of the film 24. The first axial surface 44 extends axially relative to the axis of rotation of each of the second pair of sprockets 36 and the first radial teeth 42 extend radially from the first axial surface 44. A pair of bevel gears 46 are supported by housing 20 adjacent each of the edges of the film 24 and interconnect the shaft 36 and the second pair of sprockets 40.

Figure 9:
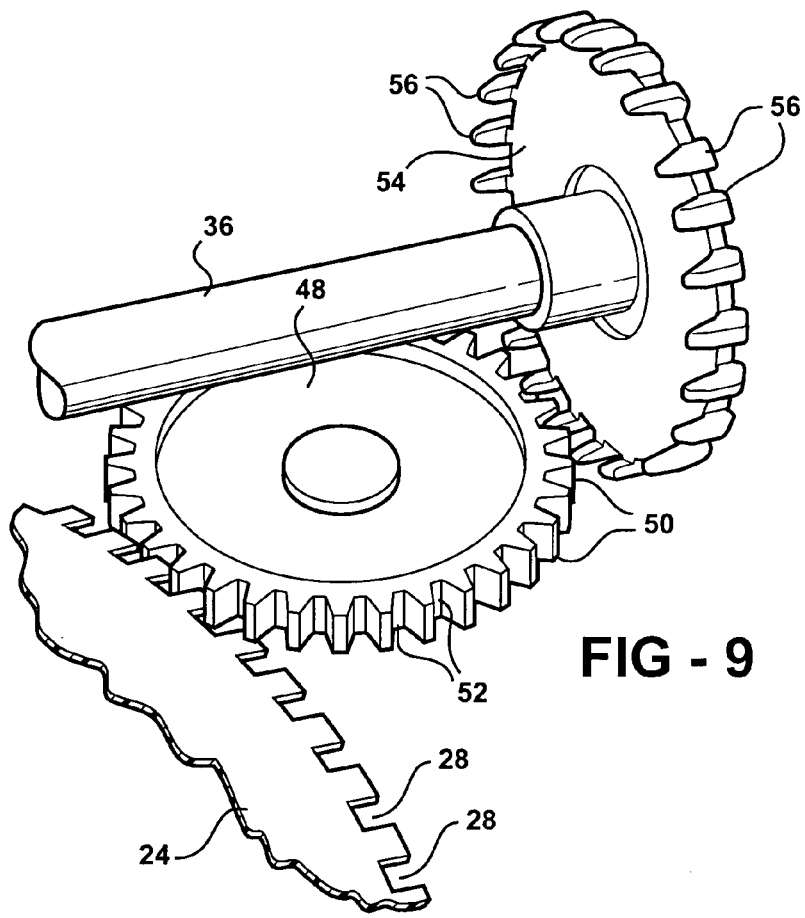
FIG. 9 is a perspective view of a third embodiment of the valve of the subject invention.

The third embodiment of the subject invention, as seen in FIG. 9 is like the second embodiment of the subject invention as seen in FIGS. 6-8 in that the film 24 is reciprocated along the curved path by a third pair of sprockets 48, each rotatably supported by the housing 20 for rotation about an axis of rotation that is disposed transversely to the film 24. The third pair of sprockets 48 have second radial teeth 50 engaging the recesses 28 in the edges of the film 24 for moving the film 24 linearly, i.e., in the direction of the edges of the film 24. The second radial teeth 50, like the first radial teeth 42, extend radially from the axis of rotation and parallel to the film 24 to engage the recesses 28 from the edge. Each of the third pair of sprockets 48 includes a circumferential or second axial surface 52 extending between adjacent second radial teeth 50 and facing the edge of the film 24. The second axial surface 52 extends axially relative to the axis of rotation of each of the third pair of sprockets 48 and the second radial teeth 50 extend radially from the second axial surface 52. Instead of a pair of bevel gears 46, the third embodiment includes a spur 54 supported on and driven by the shaft 36 and having projecting teeth 56 disposed circumferentially about the spur 54 and extending axially and parallel to one another and parallel to the shaft 36 to engage the second radial teeth 50 of the third pair of sprockets 48.

Figure 10:
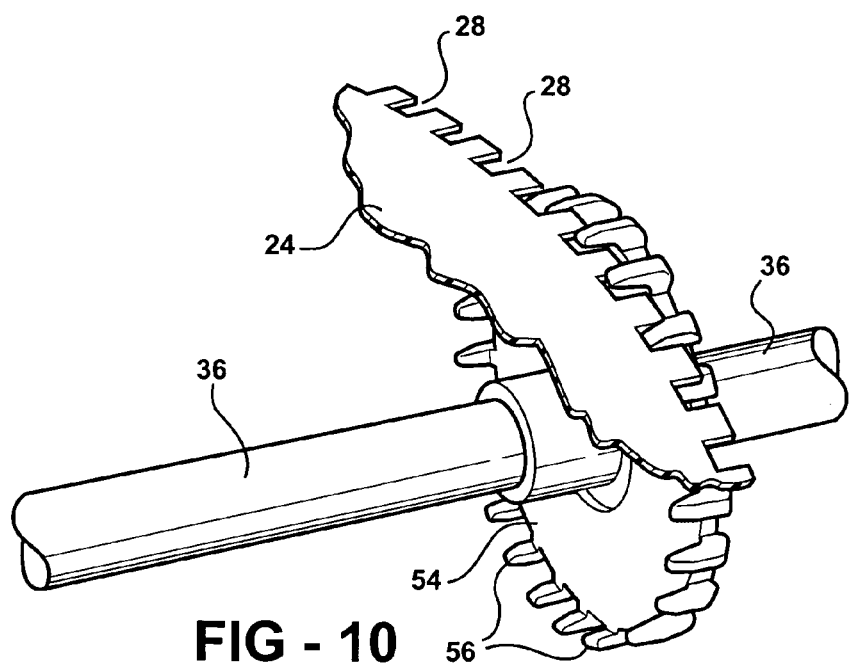
FIG. 10 is a perspective view of a fourth embodiment of the valve of the subject invention.

In the fourth embodiment of the subject invention, as seen in embodiment of FIG. 10, the spur 54 may be of different diameter, but directly engages the recesses 28 in the edges of the film 24.

Obviously, many modifications and variations of the present invention are possible in light of the above teachings. The invention may be practiced otherwise than as specifically described within the scope of the appended claims.

What is claimed is:

1. A heating, ventilation and air conditioning (HVAC) system comprising;
    a housing defining an air passage for directing air flow through said housing,
    a valve including a film defining an outer surface and a width with said outer surface extending across said width to distal terminal peripheries of said film defining opposing first and second peripheral edges of said film with said peripheral edges extending transverse to said outer surface to define a thickness of said film substantially transverse to said width and an opening disposed between said peripheral edges through said outer surface and supported by said housing to extend across said passage,
    a first sprocket rotatably supported by said housing for rotation about an axis and having teeth engaging said film for moving said film linearly,
    a second sprocket rotatable about said axis and having teeth engaging said film for moving said film linearly,
    a shaft extending transverse to said peripheral edges and defining said axis with said first sprocket coupled to one end of said shaft and said second sprocket coupled to an opposing end of said shaft, and
    said film defining recesses open to and disposed along each of said first and second peripheral edges with said teeth of said first sprocket extending into and out of said recesses of said first peripheral edge and said teeth of said second sprocket extending into and out of said recesses of said second peripheral edge such that said first and second peripheral edges of said film are captured entirely between said sprockets with said film being capable of floating relative to said sprockets while said sprockets maintain continuous engagement with said recesses for moving said film across said air passage relative to said sprockets.

2. A system as set forth in claim 1 wherein each of said sprockets include a surface extending between adjacent teeth and facing said peripheral edge of said film.

3. A system as set forth in claim 2 wherein said surface extends radially relative to said axis and said teeth extend axially from said surface with said surface of said first and second sprockets engaging said first and second peripheral edges, respectively, for capturing said film between said sprockets.

4. A system as set forth in claim 1 wherein said axis is disposed transversely to said film and said teeth extend radially from said axis and parallel to said film to engage said recesses from said edge.

5. A system as set forth in claim 4 wherein said teeth have a width transverse to said film of at least 0.125 inches.

6. A system as set forth in claim 1 including a heat exchanger supported in said housing for exchanging heat with air passing through said passage.

7. A system as set forth in claim 1 including an evaporator core and a heater core supported in said housing for exchanging heat with air passing through said passage.

8. A system as set forth in claim 4 including a pair of bevel gears adjacent each of said peripheral edges and interconnecting said shaft and said sprockets with at least one of said bevel gears on each of said peripheral edges presenting an abutment surface engaging said film when said film floats relative to said sprockets.

9. A system as set forth in claim 1 wherein said film has a thickness between 0.001 and 0.03 inches.

10. A system as set forth in claim 1 wherein said film comprises a plastic material.

11. A system as set forth in claim 1 wherein said film is made of a plastic material selected from the group of polypropylene, polypropylene co-polymer, polytetrafluoroethylene, and combinations thereof.

12. A system as set forth in claim 1 wherein said film has a flexural modulus between 100,000 and 300,000 psi.

13. A system as set forth in claim 12 wherein said film extends linearly along a curvature.

14. A system as set forth in claim 13 wherein said curvature is between flat and a radius of 100 mm.

15. A system as set forth in claim 1 including a plurality of said openings with each of said openings being elongated with rounded corners.

16. A system as set forth in claim 15 wherein said openings are of different lengths.

17. A system as set forth in claim 1 wherein said film includes a leading edge extending between said peripheral edges and a trailing edge extending between said peripheral edges.

18. A system as set forth in claim 17 wherein at least one of said leading edge and said trailing edge is undulated.

19. A system as set forth in claim 18 wherein at least one of said leading edge and said trailing edge defines another opening with said housing to facilitate the air flow through said passage.

20. A system as set forth in claim 1 wherein said recesses have three sides defined by said film.

21. A heating, ventilation and air conditioning (HVAC) system comprising;
    a housing defining an air passage for directing air flow through said housing,
    a valve including a film terminating at a leading edge, a trailing edge, and opposing first and second peripheral edges with said peripheral edges interconnecting said leading and trailing edges and defining an opening disposed between said peripheral edges supported by said housing to extend across said passage,
    a first sprocket rotatably supported by said housing for rotation about an axis and having teeth engaging said film for moving said film linearly,
    a second sprocket rotatable about said axis and having teeth engaging said film for moving said film linearly,
    a shaft extending transverse to said peripheral edges and defining said axis with said first sprocket coupled to one end of said shaft and said second sprocket coupled to an opposing end of said shaft, and
    said film defining recesses with each of said recesses having at least one side and said recesses creating a plurality of separate cantilevered portions terminating at each of said first and second peripheral edges and interconnected by said sides of adjacent recesses with said teeth of said first sprocket extending into and out of said recesses of said first peripheral edge and said teeth of said second sprocket extending into and out of said recesses of said second peripheral edge such that said first and second peripheral edges of said film are captured entirely between said sprockets with said film being capable of floating relative to said sprockets while said sprockets maintain continuous engagement with said recesses for moving said film across said air passage relative to said sprockets.

22. A system as set forth in claim 21 wherein said recesses have three sides defined by said film.

23. A system as set forth in claim 1 wherein said first and second sprockets extend inwardly from said first and second peripheral edges, respectively, and present an abutment surface engaging said film when said film floats relative to said sprockets.

24. A system as set forth in claim 21 wherein said first and second sprockets extend inwardly from said first and second peripheral edges, respectively, and present an abutment surface engaging said film when said film floats relative to said sprockets.

25. A system as set forth in claim 1 including a pair of bevel gears adjacent each of said peripheral edges and interconnecting said shaft and said sprockets with at least one of said bevel gears on each of said peripheral edges presenting an abutment surface engaging said film when said film floats relative to said sprockets.

* * * * *